United States Patent [19]

Watanabe

[11] Patent Number: 4,941,441

[45] Date of Patent: Jul. 17, 1990

[54] ENGINE BRAKE SYSTEM OF A TWO-CYCLE ENGINE FOR A MOTOR VEHICLE

[75] Inventor: Hideo Watanabe, Tokyo, Japan

[73] Assignee: Fuji Jukogyo Kabushiki Kaisha, Tokyo, Japan

[21] Appl. No.: 395,955

[22] Filed: Aug. 18, 1989

[30] Foreign Application Priority Data

Aug. 30, 1988 [JP]  Japan ................................. 63-216092

[51] Int. Cl.$^5$ .............................................. F02D 9/00
[52] U.S. Cl. ....................................... 123/325; 123/423
[58] Field of Search ..................... 123/325, 423, 394; 180/177

[56] References Cited

U.S. PATENT DOCUMENTS

| | | | |
|---|---|---|---|
| 4,484,497 | 11/1984 | Hibino | 123/325 |
| 4,658,781 | 4/1987 | Guinca | 123/325 |
| 4,870,933 | 10/1989 | Mizuno | 123/325 |

FOREIGN PATENT DOCUMENTS 61-272425  12/1986  Japan .

*Primary Examiner*—Raymond A. Nelli
*Attorney, Agent, or Firm*—Martin A. Farber

[57] ABSTRACT

A two-stroke engine has a scavenge pump provided in an intake passage, a bypass around the scavenge pump and a fuel injector provided for injecting fuel in a cylinder of the engine. A valve is provided in the bypass so as to close the bypass. When deceleration of a vehicle is detected, the valve is closed and the fuel injection from the fuel injector is stopped.

3 Claims, 3 Drawing Sheets

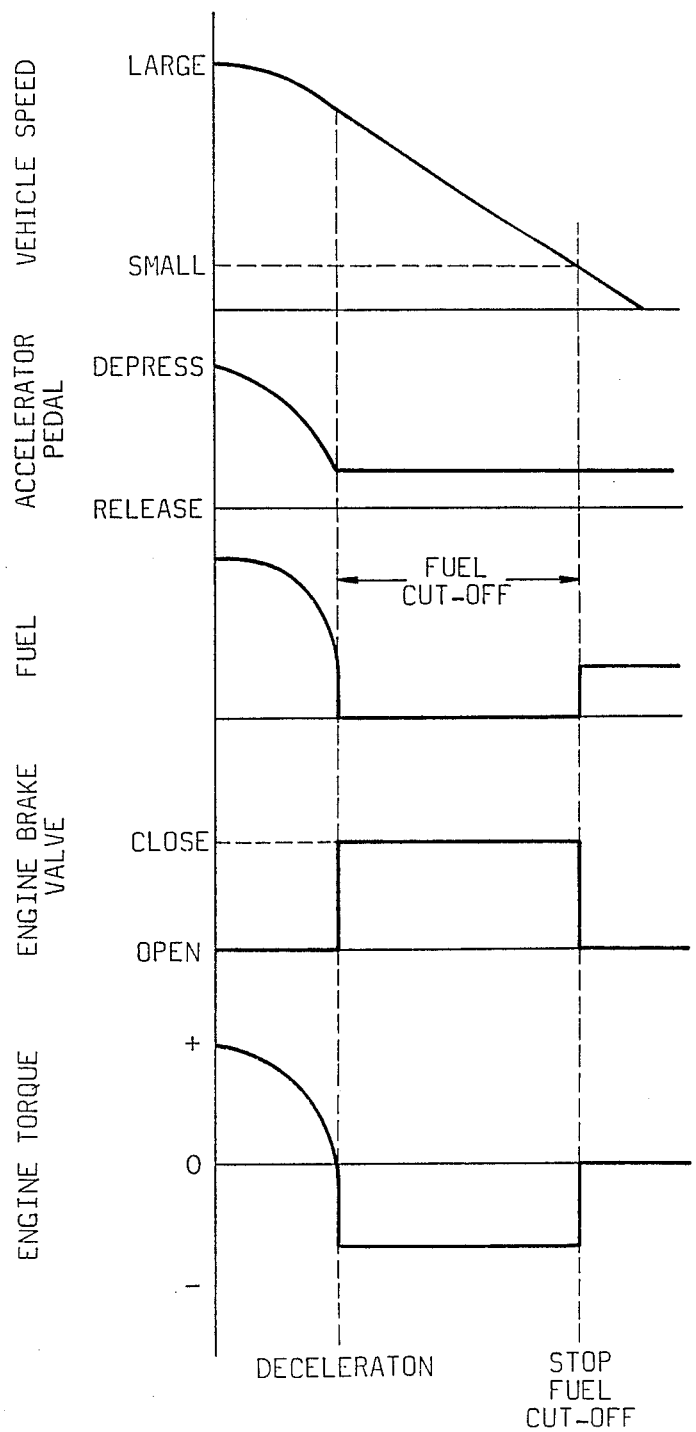

ENGINE BRAKE SYSTEM OF A TWO-CYCLE ENGINE FOR A MOTOR VEHICLE

BACKGROUND OF THE INVENTION

The present invention relates to an engine brake system of a two-cycle engine, and more particularly to a system for increasing an engine braking effect of the two-cycle engine.

The two-cycle engine inherently has low pumping loss compared to the four-cycle engine, because the two-stroke cycle of the two-cycle engine completes with one-revolution of a crankshaft. Consequently, a vehicle driven by the two-cycle engine has a small engine braking effect Japanese Patent Application Laid-Open No. 61-272425 disclose a two-stroke engine having a system for increasing the braking effect of the two-cycle engine. The combustion chamber of the engine has a valve for communicating the chamber with the atmosphere through an exhaust pipe. When a grip for controlling a throttle valve of the engine is further rotated from an idling position to a more closing position, the valve is opened to communicate the combustion chamber with the atmosphere. Thus, gas in the chamber flows alternately passing through the valve in accordance with the reciprocation of a piston, generating resistance against the piston of the engine to increase the engine braking effect.

However, the gas in the combustion chamber is decompressed, causing deterioration in combustion.

SUMMARY OF THE INVENTION

The object of the present invention is to provide a two-cycle engine with a scavenge pump where engine brake may be effectively increased.

There has been proposed the use of a scavenge pump for a two-cycle engine. In such a system, the engine braking effect can be increased, if the load on the scavenge pump is increased. In the present invention, the scavenge pump is utilized for increasing the engine braking effect.

According to the present invention, there is provided an engine brake system of a two-cycle engine for a motor vehicle, the engine having at least one cylinder, a scavenge port, an intake passage communicated with said scavenge port, a fuel injector provided for injecting the fuel in the cylinder, a scavenge pump provided in said intake passage for supplying intake air to the cylinder and a bypass provided around the scavenge pump.

The system comprises detector means for detecting deceleration of the vehicle and for producing a deceleration signal, a valve provided in the bypass so as to close the bypass, means responsive to the deceleration signal for closing the valve and stopping fuel injection from the fuel injector.

In an aspect of the invention, the detector means detects engine speed and vehicle speed. An auxiliary valve may be provided in the intake passage for closing the intake passage in response to the deceleration signal.

These and other objects and features of this invention will become understood from the following description with reference to the accompanying drawings.

BRIEF DESCRIPTION OF DRAWINGS

FIGS. 3a to 3e respectively show vehicle speed, fuel quantity, closing and opening of engine brake valves and engine torque with time, at deceleration of a vehicle.

DETAILED DESCRIPTION OF THE PREFERRED EMBODIMENT

Figure 1:
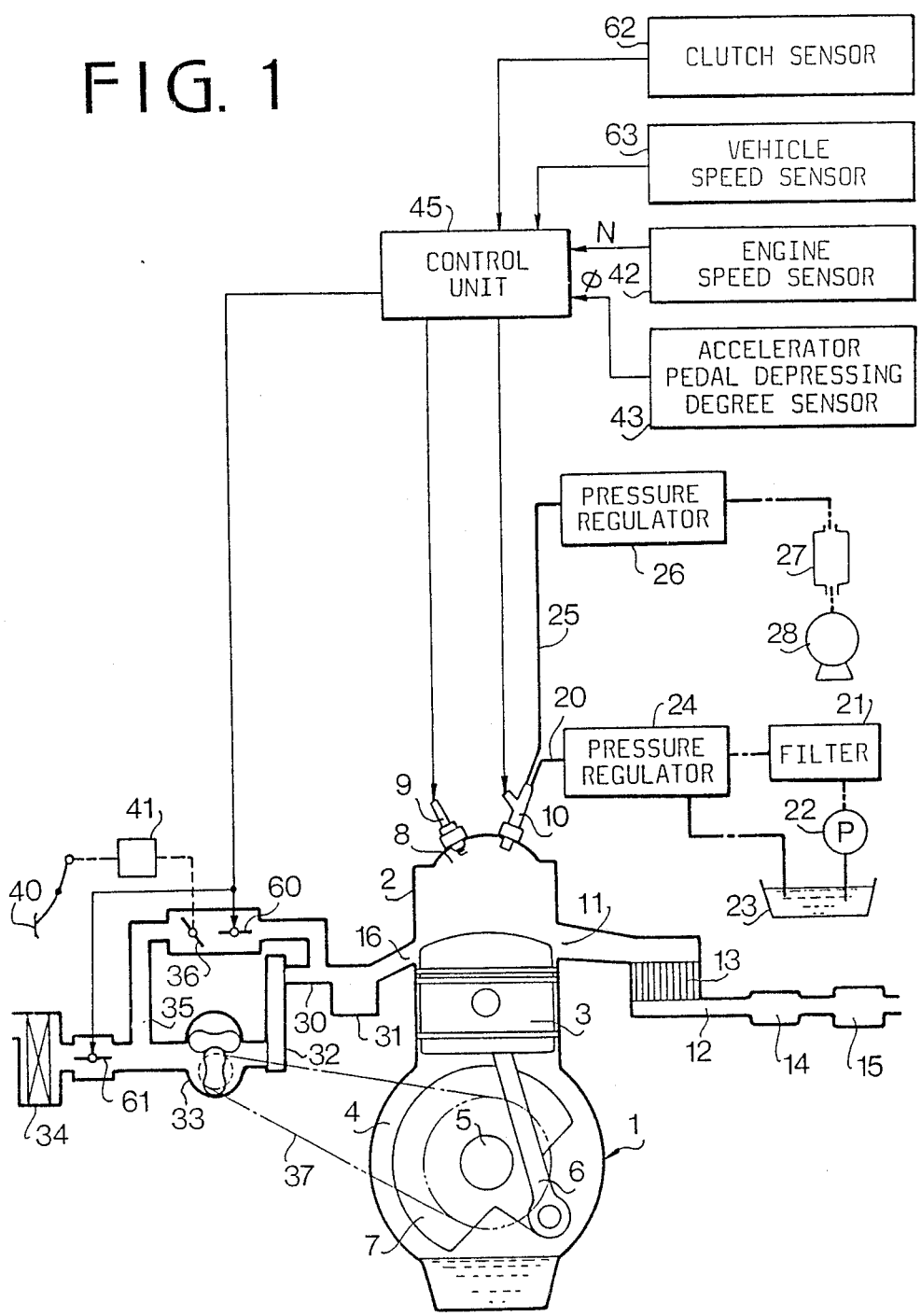
FIG. 1 is a schematic diagram of a two-cycle engine of the present invention.

Referring to FIG. 1, a two-cycle engine 1 for a motor vehicle comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce the inertia of the piston 3 reciprocating in the cylinder 2.

In a wall of the cylinder 2, an exhaust port 11 and a scavenge port 16 are formed in 90 degrees angular disposition or opposing one another. The ports 11 and 16 are adapted to open at a predetermined timing with respect to the position of the piston 3.

A fuel injector 10 and a spark plug 9 are provided on a top of a combustion chamber 8 of the cylinder 2. The injector 10 is a type where a predetermined amount of fuel is injected together with air by compressed air in the form of air-fuel mixture. Fuel in a fuel tank 23 is supplied to the injector 10 through a fuel passage 20 having a filter 21, a pump 22 and a pressure regulator 24 for constantly maintaining the fuel at a predetermined low fuel pressure. The fuel is mixed with air supplied to the injector 10 through a compressor 28 passing through an air passage 25 having an accumulator 27 and a pressure regulator 26.

The engine 1 is supplied with air through an air cleaner 34, a displacement scavenge pump 33, an intercooler 32 for cooling scavenge air, an intake pipe 30 having a scavenge chamber 31 for absorbing scavenge pressure waves when the scavenge port 16 is opened or closed. A bypass 35 is provided around the scavenge pump 33 and the intercooler 32. The bypass 35 is provided with a control valve 36. An engine brake valve 60 is provided in the bypass 35 and an auxiliary valve 61 is provided in the intake pipe 30 upstream of the junction of the intake pipe 30 and the bypass at the inlet thereof. Exhaust gas of the engine 1 is discharged passing through the exhaust port 11, an exhaust pipe 12 having a catalytic converter 13, an exhaust chamber 14 and a muffler 15.

The scavenge pump 33 is operatively connected to the crankshaft 5 through a transmitting device 37 comprising an endless belt running over a crank pulley and a pump pulley. The scavenge pump 33 is driven by the crankshaft 5 through the transmitting device 37 for producing a scavenge pressure. An accelerator pedal 40 is operatively connected with the control valve 36 through a valve controller 41. The opening degree of the control valve 36 is controlled by the controller 41 so as to be inversely proportional to the depressing degree of the accelerator pedal 40. Further, an engine speed sensor 42 and an accelerator pedal depressing degree sensor 43 are provided for determining engine operating conditions. A clutch sensor 62 which produces an output signal when a clutch (not shown) is engaged, and a vehicle speed sensor 63 are provided for determining conditions for engine braking.

Output signals from the sensors 42, 43, 62 and 63 are supplied to a control unit 45 which feeds an ignition signal, an air injection pulse signal and a fuel injection pulse signal to the spark plug 9 and the injector 10, respectively. The valves 60 and 61 are also fed with signals from the control unit 45 so that they are closed at engine braking.

Figure 2:
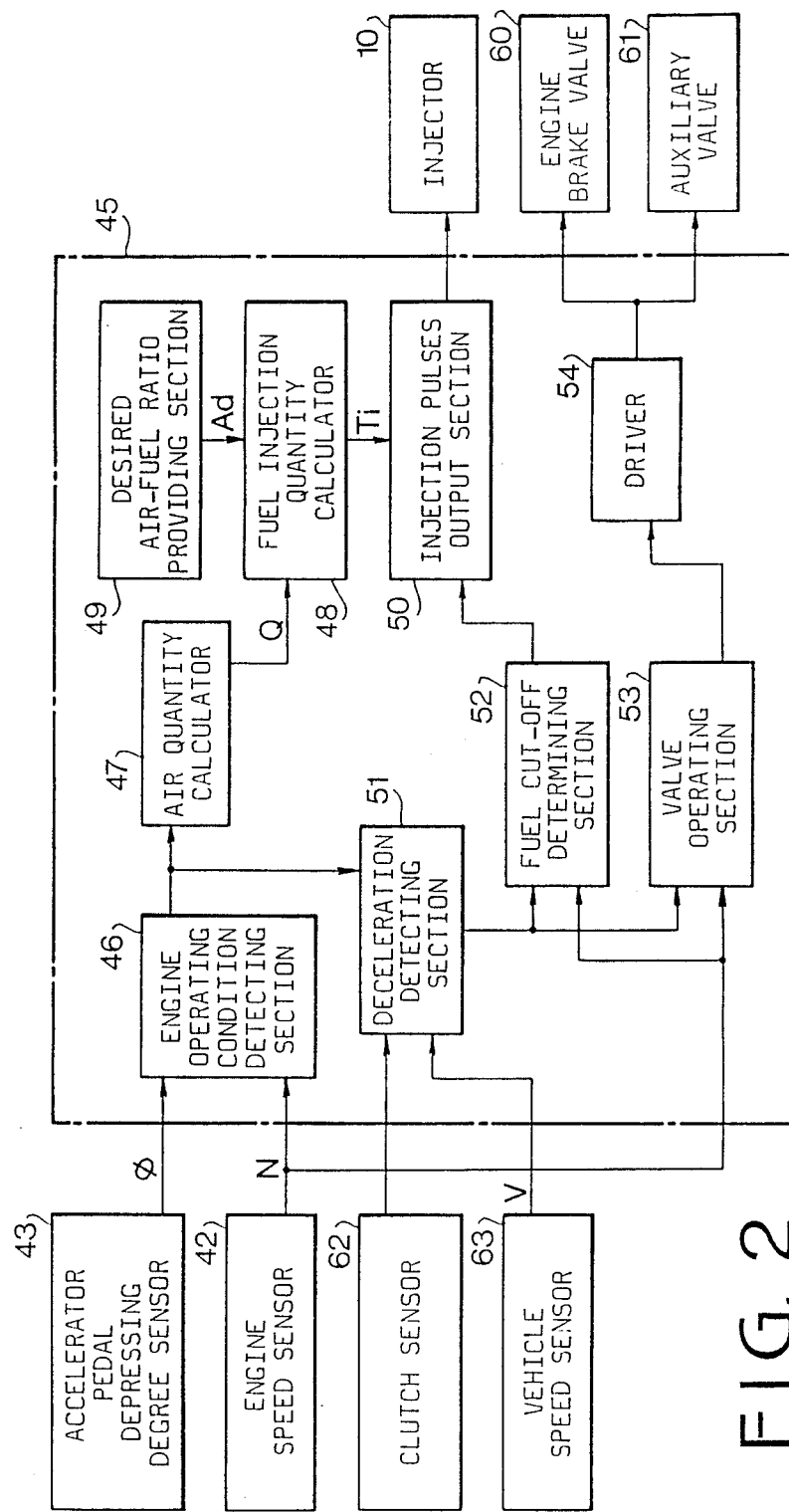
FIG. 2 is a block diagram showing a control unit according to the present invention.

Referring to FIG. 2, the control unit 45 comprises an engine operating condition detecting section 46 to which engine speed N and accelerator pedal depressing degree $\phi$ are applied. An output signal of the detecting section 46 is fed to an air quantity calculator 47 where air quantity Q in the cylinder 2 is calculated based on the engine speed N and the accelerator pedal depressing degree $\phi$, while taking into account of quantities of escape air at the scavenging and compressed air injected with fuel. The air quantity Q is fed to a fuel injection quantity calculator 48. In the fuel injection quantity calculator 48, a fuel injection quantity Ti is calculated from the equation, $$Ti = Q/Ad$$

where Ad is a desired air-fuel ratio (stoichiometry). The desired ratios Ad are stored in a table in a desired air-fuel ratio providing section 49, arranged in accordance with the engine operating conditions. The fuel quantity Ti is fed to an injection pulses output section 50 where a fuel injection pulse width corresponding to the calculated fuel quantity Ti is determined. The output section 50 applies a fuel injection pulse signal and an air injection pulse signal to the injector 10 to inject the fuel.

The control unit 45 is further provided with a deceleration detection section 51 to which output signals of the clutch sensor 62, vehicle speed sensor 63 and the engine operating condition detecting section 46 are applied. The detecting section 51 produces a deceleration signal representing the deceleration of the vehicle when the accelerator pedal depressing degree $\phi$, vehicle speed V and engine speed decrease and the clutch is engaged. The deceleration signal from the detecting section 51 and engine speed N are fed to a fuel cut-off determining section 52 which produces a fuel cut-off signal when the engine speed is below a predetermined engine speed $N_O$. The fuel cut-off signal is fed to the injection pulses output section 50 to stop the fuel injection.

The deceleration signal and the engine speed N are further applied to a valve operating section 53 which produces a valve closing signal. The valve closing signal is applied to engine brake valve 60 and the auxiliary valve 61 through a driver 54 when the engine speed is lower than the predetermined speed $N_O$.

The operation of the two-cycle engine is described hereinafter.

The air supplied from the scavenge pump 33 and cooled at the intercooler 32 is returned to the inlet side of the scavenge pump 33 through the bypass 35. Since the opening degree $\theta$ of the control valve 36 is controlled to be inversely proportional to the depressing degree $\phi$ of the accelerator pedal 40, when the depressing degree $\phi$ of the accelerator pedal is small, the control valve 36 is largely opened. As a result, a large amount of air is returned to the inlet side of the scavenge pump 33. Thus, a small amount of air, which corresponds to the small accelerator pedal depressing degree, flows into the cylinder 2 for scavenging without causing pumping loss. As the depressing degree $\phi$ increases, the quantity of fresh air forced into the cylinder 2 increases with decrease of the opening degree of the control valve 36.

When the piston 3 reaches a position close to the bottom dead center as shown in FIG. 1, the scavenge port 16 opens as well as the exhaust port 11 so that intake air, quantity of which depends on the position of the accelerator pedal 40, is delivered by the scavenge pump 33 into the cylinder 2 through the intercooler 32 and the scavenge port 16. Consequently, burned gas in the cylinder 2 is scavenged so that fresh intake air is admitted therein in a short time. During the compression stroke, the piston 3 rises, closing both ports 11 and 16. A dose of fuel accumulated in the injector 10 in accordance with the fuel injection pulse signal from the control unit 45 is injected by the compressed air, which is supplied in accordance with the air pulse signal, as air-fuel mixture. The mixture is swirling in the combustion chamber with the scavenging air and ignited by the spark plug 9 immediately before the top dead center. After the explosion, the piston 3 descends for the power stroke. Accordingly, the exhaust port 11 is opened so that burned gas in the cylinder 2 which is still under high pressure escapes. The piston 3 further descends, thereby returning to the afore-described intake stroke where cylinder 2 is scavenged.

In the control unit 45, the engine speed N and the accelerator pedal depressing degree $\phi$ detected by the sensors 42 and 43, respectively, are fed to the engine operating condition detecting section 46 to detect the engine operating conditions. The air quantity Q and the desired air-fuel ratio Ad which are obtained in accordance with the engine operating conditions in the air-quantity calculator 47 and the desired air-fuel ratio providing section 49, respectively, are applied to the fuel injection quantity calculator 48 so that the fuel injection quantity Ti dependent on the engine operating conditions is calculated. A fuel injection pulse width signal representing the quantity Ti is fed to the injector 10 through the injection pulses output section 50 so that a quantity of fuel corresponding to the quantity Ti is injected from the injector 10. Thus, the combustible mixture is maintained at the desired air-fuel ratio.

The operation of the system of the present invention is described hereinafter with reference to FIGS. 3a to 3e.

When the accelerator pedal 40 is released while the vehicle is running, the deceleration signal is fed to the fuel cut-off determining section 52 from the deceleration determining section 51. When the engine speed N is higher than $N_O$, the fuel is cut off as shown in FIG. 3c in accordance with the fuel cut-off signal from the fuel cut-off determining section 52. Thus, the combustion stops, ceasing the generation of engine torque.

At the same time, as shown in FIG. 3d, the engine brake valves 60, 61 are closed in dependency on the valve closing signal from the valve operating section 53. Therefore, the air returning through the bypass 35 to the inlet side of the scavenge pump 33 is blocked by the valve 60. As a result, the ratio of pumping pressure of the scavenge pump 33 increases. In addition, the auxiliary valve 61 is also closed to increase the ratio. Since the scavenge pump 33 as well as the engine 1 is mechanically driven by the driving wheels, pumping work of the pump 33 increases, thereby increasing load on the power train to increase engine braking effect as shown in FIG. 3e.

When the vehicle speed and the engine speed decrease to predetermined respective speeds, owing to the engine braking effect, the deceleration detecting section 51 stops producing the deceleration signal. Therefore, the valve closing signal disappears, thereby opening the valves 60 and 61. The fuel cut-off signal is also discontinued, so that the combustion is started without misfire by injecting a necessary minimum quantity of fuel.

The auxiliary valve 61 may be omitted or disposed in the exhaust pipe 12. Since the scavenge pump 33 is compulsively driven to increase the pumping work, a large load is exerted thereon. Accordingly, it is preferable to limit the range where engine brake is effected in accordance with vehicle speed in consideration of the capacity of the pump.

In accordance with the present invention, there is provided a simplified engine brake system for a two-cycle engine with a scavenge pump. In addition, injection of fuel is cu-off so as to increase the engine braking effect.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An engine brake system of a two-cycle engine for a motor vehicle, the engine having at least one cylinder, a scavenge port, an intake passage communicated with said scavenge port, a fuel injector provided for injecting fuel in the cylinder, a scavenge pump provided in said intake passage for supplying intake air to the cylinder and a bypass provided around the scavenge pump, the system comprising:
   detector means for detecting deceleration of the vehicle and for producing deceleration signal;
   a valve provided in the bypass so as to close the bypass;
   means responsive to the deceleration signal for closing the valve and for stopping fuel injection from the fuel injector.

2. The system according to claim 1 wherein:
   the detector means detects engine speed and vehicle speed.

3. The system according to claim 1 further comprising an auxiliary valve provided in the intake passage for closing the intake passage in response to the engine speed and deceleration signal.

* * * * *